United States Patent Office 3,201,199
Patented Aug. 17, 1965

3,201,199
METHOD OF PRODUCING LOW SODA
CONTENT ALUMINA
James Gordon Lindsay and William Peter Charles Kinsman, Arvida, Quebec, Canada, assignors to Aluminum Laboratories Limited, Montreal, Quebec, Canada, a corporation of Canada
No Drawing. Filed Mar. 6, 1962, Ser. No. 177,740
5 Claims. (Cl. 23—143)

This invention relates to alumina. More particularly, this invention relates to low soda content alumina. Still more particularly, this invention relates to a method of preparing low soda content alumina trihydrate and low soda content activated alumina.

Activated alumina is used extensively in the chemical and petroleum industries as a catalyst or catalyst support and as a processing agent, such as a dehydrating agent. When used as a catalyst or catalyst support, activated alumina should have a low soda content or be substantially free of soda.

Soda content is usually expressed as percent by weight sodium oxide ($Na_2O$) based on the weight of alumina trihydrate ($Al_2O_3 \cdot 3H_2O$). Activated alumina, or alumina trihydrate employed for the manufacture of activated alumina by calcining at a moderate temperature, below 900° C., such as about 500° C., to yield activated alumina for use as a catalyst or catalyst support, should be substantially free of soda, i.e. having a soda content below about 0.10%.

Since alumina is modified during high temperature calcining, at a temperature above about 900° C., more or less, to a passive form of less usefulness, the technique of reducing the soda content of alumina by high temperature calcining cannot be employed to produce low soda content activated alumina. In the past, therefore, it has been necessary in order to prepare low soda content alumina or low soda content alumina trihydrate to react aluminum metal with alcohols or amines in order to produce soda-free alumina hydrate which is then activated by moderate calcining to produce activated alumina.

Tremendous quantities of alumina, as alumina trihydrate, are available in the aluminum industry which employs as a processing step the Bayer process for the recovery of alumina from the alumina ores, such as bauxite. The alumina is then processed by electrolysis to produce substantially pure aluminum.

In the Bayer process alumina ore, such as alumina trihydrate-containing bauxite, is leached or digested in an aqueous caustic solution under pressure and at an elevated temperature, above about 100° C., to extract the alumina content of the ore as sodium aluminate. The impurities in the ore remain for the most part as insoluble residues. At the digestion temperature sufficient alumina is dissolved in the aqueous caustic solution to produce an aluminate solution which is somewhat short of saturation. The resulting solution, or slurry, is then cooled by flashing or pressure reduction to atmospheric pressure to about 100° C. The cooled solution is then filtered to remove the insoluble residues, primarily iron oxides, titania and sodium aluminum silicates. The resulting filtrate, sodium aluminate solution, is now supersaturated with respect to gibbsite, alumina trihydrate ($Al_2O_3 \cdot 3H_2O$). The solution is then further cooled to a temperature in the range 60–75° C., at which temperature the solution is strongly supersaturated with alumina trihydrate.

A seed charge of previously precipitated finely divided alumina trihydrate is then added to the supersaturated filtrate and the resulting slurry agitated for a period of about 24 hours, or more, to cause precipitation of alumina trihydrate on the added alumina trihydrate seed particles. During the precipitation operation approximately 50% of the alumina in the solution precipitates as alumina trihydrate. The thus-produced alumina trihydrate has a soda content in the range 0.35–0.50%, more or less, a soda content too high for the production of activated alumina therefrom if the activated alumina is to be employed as a catalyst or catalyst support.

It is an object of this invention to provide an improved process for the manufacture of low soda content alumina trihydrate.

It is another object of this invention to provide an improved process for the manufacture of low soda content or substantially soda-free activated alumina.

Still another object of this invention is to provide a process for the manufacture of low soda content Bayer process alumina trihydrate.

Yet another object of this invention is to provide a process for the manufacture of low soda content activated alumina derived from Bayer process alumina trihydrate.

Yet another object of this invention is to provide a method of carrying out the Bayer process for the production of alumina trihydrate whereby low soda, below about 0.10% soda, alumina trihydrate is produced.

How these and other objects of this invention are achieved will become apparent in the light of the accompanying disclosure.

It has now been discovered that the soda content of alumina trihydrate precipitated from an aqueous caustic solution is directly proportional to the degree or extent of alumina supersaturation, i.e. alumina content or concentration, in the precipitating solution. In accordance with this invention, to precipitate low soda content or substantially soda-free alumina trihydrate from an aqueous alumina-containing caustic solution it is only necessary to carry out the precipitation under conditions which will maintain a low degree of alumina supersaturation in the precipitating solution. This may be accomplished over a wide range of temperature provided only that the alumina concentration in the solution during the precipitation operation is such that at the precipitating temperature a small degree of alumina supersaturation is maintained.

The solubility of alumina trihydrate in aqueous caustic solution increases with increasing temperature and with increasing caustic concentration. For a caustic concentration of about 120 grams $NaOH$ per liter and at a temperature of 70° C. the equilibrium solubility of alumina trihydrate is approximately 43 grams per liter, expressed as $Al_2O_3$. However, the solubility of alumina trihydrate in the same caustic solution at a temperature of about 150° C. is approximately 117 grams $Al_2O_3$ per liter. Thus, an aqueous caustic solution which is saturated with alumina trihydrate at 150° C. will be strongly supersaturated at a temperature of 70° C.

Supersaturation, or dissolved alumina trihydrate concentration above equilibrium solubility concentration, is the driving force for the precipitation of alumina trihydrate, such as the alumina trihydrate precipitated from the aqueous alumina-containing caustic solution obtained after flashing in the Bayer process. Accordingly, the greater the degree of supersaturation the faster will be the rate of precipitation. Temperature of the precipitating solution also influences the rate of precipitation. The greater the temperature of the aqueous alumina-containing caustic solution the faster will be the rate of alumina trihydrate precipitation. However, for a given initial alumina concentration the effect of increased temperature will partially be compensated by a decrease in alumina supersaturation, i.e. the difference between alumina concentration at the temperature of precipitation and the alumina equilibrium solubility at this same temperature.

An increase in the amount of alumina trihydrate seed charge to provide precipitation sites for the alumina trihydrate to be precipitated will also increase the overall rate of alumina trihydrate precipitation by providing increased surface area or sites on which the alumina trihydrate precipitates.

Since precipitation at constant temperature from a slightly supersaturated solution will be slow and the yield of precipitated alumina trihydrate per unit volume of solution will be small within a given time, and although the resulting precipitated alumina trihydrate under such conditions would tend to be substantially soda-free, such as having a soda content below about 0.10% and suitable for use in the preparation of activated alumina, it is expedient and desirable to carry out the precipitation operation at as high a temperature as permissible and, also, employing a large amount of alumina trihydrate seeding material. Further, in order to increase the yield of low soda content alumina trihydrate it is also expedient in accordance with this invention to initiate the precipitation operation at as high a temperature as is practical, such as about 100° C., e.g. a temperature in the range 80–100° C., and to cool the precipitating solution at such a rate so as to maintain a controlled, small, and preferably constant, alumina supersaturation. If desired, the precipitation operation can be carried out isothermally at a temperature in the range 50–100° C., more or less.

Solubilities and concentrations of alumina trihydrate in aqueous caustic solutions are often given in terms of an alumina/caustic ratio wherein alumina is expressed in terms of grams per liter $Al_2O_3$ and caustic (NaOH) is expressed in grams per liter equivalent $Na_2CO_3$. By expressing the amount of supersaturation of alumina in aqueous caustic solutions in terms of ratio units variations in caustic concentration can be taken into account.

In the precipitation of substantially soda-free alumina from aqueous caustic solutions in accordance with the practices of this invention the supersaturation of alumina in the aqueous caustic solution during the precipitation operation is maintained at a relatively low level, not greater than about 0.13 ratio unit, i.e. the amount of alumina supersaturation is not greater than 0.13 ratio unit above the equilibrium solubility of the alumina trihydrate in the aqueous caustic solution from which the alumina is precipitated. In accordance with a particular embodiment of the practice of this invention the alumina supersaturation during the precipitation operation is maintained at a value not greater than 20 grams alumina trihydrate per liter aqueous caustic solution, such as in the range 5–20 grams alumina trihydrate per liter, above the equilibrium alumina trihydrate solubility in the solution at the precipitating temperature.

Further, in carrying out the practices of this invention the aqueous alumina-containing caustic solution should preferably be substantially free of organic compounds or should contain a low organics content since it has been observed that the presence of organic compounds in the precipitating solution tends to increase the soda content of the precipitated alumina trihydrate.

The following examples are illustrative of the practices of this invention:

EXAMPLE NO. 1

Aqueous sodium aluminate solutions were prepared containing 119 grams per liter NaOH (equivalent to 158 grams $Na_2CO_3$ per liter), 70 grams $Na_2CO_3$ per liter and varying amounts of alumina. An amount of each solution, 35.0 ml., was seeded with 2.10 grams finely-divided alumina trihydrate (an amount equivalent to 60 grams per liter). Alumina precipitation was carried out for a period of approximately 23 hours in rotating nickel bottles at a temperature of 65° C. Following the precipitation operation the alumina solids were separated, dried, weighed and analyzed and the average alumina supersaturation in the precipitating solution (based on published values by A. S. Russell, J. D. Edwards and C. S. Taylor, "Solubility and Density of Hydrated Aluminas in NaOH Solutions," Journal of Metals, vol. 7, 1955, pages 1123–38), was calculated. The results of these tests are set forth in Table I.

Table I

| Initial Alumina Concentration | | Average Alumina Supersaturation During Precipitation | | Percent $Na_2O$ in Precipitated Alumina Trihydrate |
| --- | --- | --- | --- | --- |
| G./l. $Al_2O_3$ | Ratio, g./l. $Al_2O_3$/g./l. caustic as $Na_2CO_3$ | G./l. $Al_2O_3$ | Ratio, g./l. $Al_2O_3$/g./l. caustic as $Na_2CO_3$ | |
| 94.6 | .60 | 35.6 | .23 | 0.30 |
| 86.7 | .55 | 32.1 | .20 | 0.25 |
| 78.8 | .50 | 29.0 | .18 | 0.20 |
| 71.0 | .45 | 24.1 | .15 | 0.13 |
| 63.1 | .40 | 20.0 | .13 | 0.07 |
| 55.2 | .35 | 16.4 | .10 | 0.03 |

EXAMPLE NO. 2

A second series of tests similar to those described in connection with Example No. 1 was carried out. In this second series of tests the alumina precipitation was carried out at a temperature of 82° C. The results of this second series of tests are set forth in accompanying Table II.

Table II

| Initial Alumina Concentration | | Average Alumina Supersaturation During Precipitation | | Percent $Na_2O$ in Precipitated Alumina Trihydrate |
| --- | --- | --- | --- | --- |
| G./l. $Al_2O_3$ | Ratio, g./l. $Al_2O_3$/g./l. caustic as $Na_2CO_3$ | G./l. $Al_2O_3$ | Ratio, g./l. $Al_2O_3$/g./l. caustic as $Na_2CO_3$ | |
| 89.9 | 0.57 | 36.3 | 0.13 | 0.09 |
| 86.7 | 0.55 | 33.4 | 0.12 | 0.07 |
| 78.8 | 0.50 | 26.3 | 0.09 | 0.05 |
| 71.0 | 0.45 | 19.4 | 0.07 | 0.02 |

The tests reported hereinabove indicate that by maintaining the alumina supersaturation, i.e. amount of alumina above equilibrium solubility, at a value not greater than about 0.13 ratio unit during precipitation, substantially soda-free alumina trihydrate is precipitated. These tests also indicate the dependency of soda content of the precipitated alumina trihydrate on the average supersaturation of alumina in the aqueous caustic precipitating solution during the precipitation operation.

As will be apparent to those skilled in the art in the light of the foregoing disclosure many modifications, substitutions and changes are possible in the practice of this invention without departing from the spirit or scope thereof.

We claim:
1. A method of preparing low soda content alumina trihydrate which comprises forming a solution of alumina in aqueous caustic at an elevated temperature and effecting precipitation of alumina trihydrate, substantially free of soda, from said solution at a temperature lower than said elevated temperature and in the presence of added solid alumina trihydrate, said solution at said lower temperature being supersaturated with alumina trihydrate, said lower temperature being maintained during the precipitation of alumina trihydrate such that the amount of alumina supersaturation during the precipitation is not greater than 0.13 ratio unit above the equilibrium solubility of the alumina trihydrate in the aqueous caustic solution from which the alumina trihydrate is precipitated, said ratio unit being defined as the alumina/caustic ratio wherein alumina is expressed in terms of grams per liter $Al_2O_3$ and caustic is expressed in terms of grams per liter equivalent $Na_2CO_3$, and recovering as product the resulting precipitated, substantially soda free, alumina trihydrate having a soda content below about 0.10%.

2. A method in accordance with claim 1 wherein said lower temperature is in the range from about 50° C. to about 100° C.

3. A method of preparing low soda content alumina trihydrate which comprises digesting alumina-containing ore in an aqueous caustic solution to form a solution of alumina therein at an elevated temperature, effecting precipitation of alumina trihydrate, substantially free of soda, from said solution at a temperature lower than said elevated temperature and in the presence of added solid alumina trihydrate, said solution at said lower temperature being supersaturated with alumina trihydrate, said lower temperature being maintained during the precipitation such that the amount of alumina supersaturation during the precipitation is not greater than 0.13 ratio unit above the equilibrium solubility of the alumina trihydrate in the aqueous caustic solution from which the alumina trihydrate is precipitated, said ratio unit being defined as the alumina/caustic ratio wherein alumina is expressed in terms of grams per liter $Al_2O_3$ and caustic is expressed in terms of grams per liter equivalent $Na_2CO_3$, and recovering as product the resulting precipitated, substantially soda free, alumina trihydrate having a soda content below about 0.10%.

4. A method in accordance with claim 3 wherein said lower temperature is in the range from about 50° C. to about 100° C.

5. A method of preparing low soda content activated alumina which comprises digesting alumina-containing ore in an aqueous caustic solution at an elevated temperature, precipitating alumina trihydrate, substantially free of soda, from said solution at a temperature lower than said elevated temperature and in the presence of added solid alumina trihydrate, said solution at said lower temperature being supersaturated with alumina trihydrate, said lower temperature being maintained during the precipitation such that the amount of alumina supersaturation during the precipitation is not greater than 0.13 ratio unit above the equilibrium solubility of the alumina trihydrate in the aqueous caustic solution from which the alumina is precipitated, said ratio unit being defined as the alumina/caustic ratio wherein alumina is expressed in terms of grams per liter $Al_2O_3$ and caustic is expressed in terms of grams per liter equivalent $Na_2CO_3$, separating the resulting precipitated alumina trihydrate, subjecting the separated alumina trihydrate to heat treatment at a temperature to produce activated alumina and recovering as product the resulting activated, substantially soda free, alumina having a soda content below about 0.10%.

References Cited by the Examiner

UNITED STATES PATENTS

| | | | |
|---|---|---|---|
| 1,943,786 | 1/34 | Cowles | 23—143 |
| 2,352,867 | 7/44 | Stowe | 23—143 XR |
| 2,559,653 | 7/51 | Mooney | 23—143 |
| 2,657,978 | 11/53 | Johnson | 23—143 |
| 2,707,669 | 5/55 | Houston et al. | 23—143 |
| 2,935,376 | 5/60 | Roberts | 23—143 |

MAURICE A. BRINDISI, *Primary Examiner.*